(12) United States Patent
Phillips

(10) Patent No.: US 7,695,390 B2
(45) Date of Patent: Apr. 13, 2010

(54) MULTI-SPEED TRANSMISSION

(75) Inventor: Andrew W. Phillips, Saline, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 417 days.

(21) Appl. No.: 11/836,846

(22) Filed: Aug. 10, 2007

(65) Prior Publication Data

US 2008/0070742 A1 Mar. 20, 2008

Related U.S. Application Data

(60) Provisional application No. 60/825,972, filed on Sep. 18, 2006.

(51) Int. Cl.
*F16H 37/02* (2006.01)
(52) U.S. Cl. ...................................... 475/218
(58) Field of Classification Search ................ None
See application file for complete search history.

(56) References Cited

U.S. PATENT DOCUMENTS

| | | |
|---|---|---|
| 6,176,803 B1 | 1/2001 | Meyer |
| 6,342,026 B1 | 1/2002 | Takagi |
| 6,547,688 B2 | 4/2003 | Takagi |
| 6,736,751 B1 | 5/2004 | Usoro |
| 6,743,139 B1 | 6/2004 | Usoro |
| 6,743,140 B1 | 6/2004 | Lee |
| 6,743,142 B1 | 6/2004 | Lee |
| 6,743,143 B1 | 6/2004 | Usoro |
| 6,743,144 B1 | 6/2004 | Lee |
| 6,746,357 B1 | 6/2004 | Usoro |
| 6,752,736 B1 | 6/2004 | Lee |
| 6,755,765 B2 | 6/2004 | Usoro |
| 6,758,784 B2 | 7/2004 | Lee |
| 6,758,787 B2 | 7/2004 | Usoro |
| 6,764,424 B1 | 7/2004 | Usoro |
| 6,764,425 B2 | 7/2004 | Lee |
| 6,764,426 B2 | 7/2004 | Lee |
| 6,767,307 B1 | 7/2004 | Lee |
| 6,811,512 B2 | 11/2004 | Usoro |
| 6,837,823 B2 | 1/2005 | Lee |
| 6,852,059 B2 | 2/2005 | Lee |
| 6,960,149 B2 | 11/2005 | Ziemer |
| 7,004,878 B2 * | 2/2006 | Gumpoltsberger et al. .. 475/218 |
| 7,011,597 B2 | 3/2006 | Haka |
| 7,014,589 B2 | 3/2006 | Stevenson |
| 7,128,683 B2 | 10/2006 | Oguri |
| 7,163,484 B2 | 1/2007 | Klemen |
| 7,427,252 B2 * | 9/2008 | Holmes ..................... 475/5 |
| 7,575,529 B2 * | 8/2009 | Holmes ..................... 475/5 |
| 2006/0019791 A1 | 1/2006 | Baldwin |
| 2006/0270514 A1 | 11/2006 | Oguri |
| 2006/0270516 A1 | 11/2006 | Klemen |

* cited by examiner

*Primary Examiner*—Dirk Wright

(57) ABSTRACT

A transmission is disclosed having a planetary gear set with three input torque-transmitting mechanisms, such as friction clutches, to achieve torque flow through the planetary gear set to a countershaft gearing arrangement. The transmission includes an input member, an output member, a planetary gear set, a first, second and third torque-transmitting mechanisms and a countershaft gearing arrangement. The countershaft gearing arrangement is operatively connected with the planetary gear set and includes: a plurality of sets of co-planar intermeshing gears, a first intermediate shaft, a second intermediate shaft concentric with the first intermediate shaft, and a third intermediate shaft concentric with the second intermediate shaft.

20 Claims, 6 Drawing Sheets

| | CONTROL ELEMENTS | | | | | | | | |
|---|---|---|---|---|---|---|---|---|---|
| GEARS | 62 | 64 | 66 | 90 | 92 | 94 | 96 | 98 | 99 |
| Rev 1 | | | X | X | | | X | | |
| Rev 2 | | | X | X | X | | | | |
| 1 | | | X | X | | | | X | |
| 2 | | X | | | | | | X | |
| 3 | X | | | | X | | | | |
| 4 | | X | | | | X | | | |
| 5 | | | X | | | | | | X |
| 6 | | X | | | X | | | | |
| 7 | X | | | | X | | | | X |

Legend:   X= Engaged

| GEAR | RATIO | RATIO STEP | |
|---|---|---|---|
| R2 | -0.760 | R1-R2 | 2.9766 |
| R1 | -2.263 | R1-1 | 0.780 |
| 1 | 2.900 | 1-2 | 1.477 |
| 2 | 1.963 | 2-3 | 1.414 |
| 3 | 1.389 | 3-4 | 1.389 |
| 4 | 1.000 | 4-5 | 1.362 |
| 5 | 0.734 | 5-6 | 1.285 |
| 6 | 0.571 | 6-7 | 1.222 |
| 7 | 0.468 | OAR | 6.200 |

| | CONTROL ELEMENTS | | | | | | | | |
|---|---|---|---|---|---|---|---|---|---|
| GEARS | 260 | 262 | 264 | 266 | 268 | 270 | 272 | 274 | 276 |
| Rev 1 | | | X | X | | X | | | |
| Rev 2 | | | X | | X | X | | | |
| 1 | | | X | X | | | X | | |
| 2 | | X | | | | | X | | |
| 3 | X | | | X | | | | | |
| 4 | | | | X | | | | | X |
| 5 | | X | | | | X | | | X |
| 6 | X | | | | | X | | | |
| 7 | | X | | | | X | | X | |

Legend:  X= Engaged

| GEAR | RATIO | RATIO STEP | |
|---|---|---|---|
| R2 | -1.274 | R1-R2 | 1.894 |
| R1 | -2.413 | R1-1 | 0.832 |
| 1 | 2.900 | 1-2 | 1.512 |
| 2 | 1.919 | 2-3 | 1.407 |
| 3 | 1.364 | 3-4 | 1.364 |
| 4 | 1.000 | 4-5 | 1.218 |
| 5 | 0.821 | 5-6 | 1.140 |
| 6 | 0.720 | 6-7 | 1.565 |
| 7 | 0.460 | OAR | 6.304 |

US 7,695,390 B2

MULTI-SPEED TRANSMISSION

CROSS-REFERENCE TO RELATED APPLICATIONS

This application claims the benefit of U.S. Provisional Application No. 60/825,972, filed on Sep. 18, 2006. The disclosure of the above-referenced provisional application is incorporated herein by reference.

TECHNICAL FIELD

The invention relates to a multi-speed transmission having both a planetary gear set and a countershaft gearing arrangement.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio (with the exception of being able to achieve a direct drive ratio in a rear wheel drive application). Accordingly, the total number of gears required in this typical design is two times the number of forward speeds, plus three for reverse. This necessitates a large number of required gear pairs, especially in transmissions that have a relatively large number of forward speed ratios.

SUMMARY

A transmission is provided having a planetary gear set with three input torque-transmitting mechanisms, such as friction clutches, to achieve torque flow through the planetary gear set to a countershaft gearing arrangement. The transmission includes an input member, an output member, a planetary gear set, a first, second and third torque-transmitting mechanisms, and a countershaft gearing arrangement.

The planetary gear set has first, second and third members. The first, second and third torque-transmitting mechanisms each are selectively engageable to connect the input member with a respective different one of the members of the planetary gear set.

The countershaft gearing arrangement is operatively connected with the planetary gear set and includes: a plurality of sets of co-planar intermeshing gears, a first intermediate shaft, a second intermediate shaft, and a third intermediate shaft. The first intermediate shaft is connected for common rotation with the sun gear member of the planetary gear set. The second intermediate shaft is connected for common rotation with the carrier member of the planetary gear set. The third intermediate shaft is connected for common rotation with the ring gear member of the planetary gear set.

The countershaft is radially offset from and typically parallel to the intermediate shafts. The plurality of synchronizers are selectively engagable to connect selected ones of the gears with selected ones of said shafts for common rotation to thereby transfer torque from the planetary gear set to the output member along the shafts and the sets of co-planar intermeshing gears. Some of the synchronizers are each selectively engagable to connect a respective one of the gears rotatable about the countershaft with the countershaft for common rotation therewith.

The planetary gear set may be a beveled gear set, a simple pinion or a double pinion planetary gear set.

The countershaft gearing arrangement may be a two-axis design, having only one countershaft, or a multi-axis design, having two or more offset countershafts.

In another aspect of the invention, a reverse torque ratio may be achieved by utilizing a synchronizer that selectively connects one of the members of the planetary gear set to a stationary member to obtain a reverse torque ratio, thus eliminating the need for a dedicated set of intermeshing gears.

Thus, the present invention reduces the number of layshaft gears required for a given number of different gear states by "re-using" some or all of the physical gears in more than one gear state.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
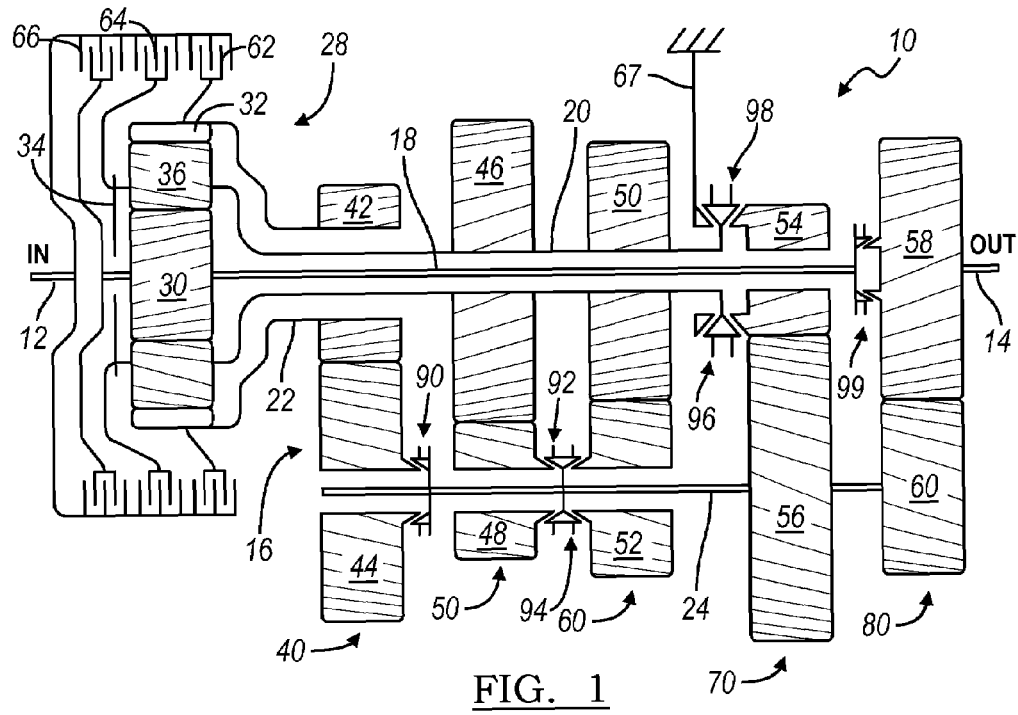
FIG. 1 is a schematic representation of an embodiment of a transmission in accordance with the present invention.
FIG. 2 is a truth table listing the engaged torque-transmitting mechanisms and synchronizers for selected torque ratios achieved by the transmission of FIG. 1.

Referring to the drawings, wherein like reference numbers refer to like components, in FIG. 1 a multi-speed transmission 10 is depicted. The transmission 10 includes an input member 12 and an output member 14. In the present embodiment, input member 12 and output member 14 are shafts, and will be referred to as such. Those skilled in the art will appreciate that the input and output members 12, 14 may be components other than shafts. The input shaft 12 is continuously connected to an engine (not shown) or to a turbine of a torque converter (not shown). The output shaft 14 is continuously connected with the final drive unit (not shown).

Transmission 10 includes a countershaft gearing arrangement 16 that includes intermediate shafts, a countershaft, co-planar intermeshing gear sets and selectively engagable synchronizers as will be described herein. For example, the countershaft gearing arrangement 16 includes a first intermediate shaft 18, second intermediate shaft 20 and a third intermediate shaft 22. Second and third intermediate shafts 20, 22 are sleeve shafts that are concentric with the first intermediate shaft 18. The countershaft gearing arrangement 16 further includes a countershaft 24. Countershaft 24 is both spaced from and parallel with input shaft 12, output shaft 14 and intermediate shafts 18, 20.

A planetary gear set 28, which is a simple planetary gear set, is connected between the input shaft 12 and the output shaft 14. The planetary gear set 28 includes sun gear member 30 connected for common rotation with the first intermediate shaft 18, a ring gear member 32 connected for common rotation with third intermediate shaft 22, and a carrier member 34 which rotatably supports a set of pinion gears 36 which intermesh with both sun gear member 30 and ring gear member 32.

The countershaft gearing arrangement 16 also includes co-planar, intermeshing gear sets 40, 50, 60, 70 and 80. Gear set 40 includes gears 42 and 44. Gear 42 is connected for common rotation with third intermediate shaft 22 and intermeshes with gear 44. Gear 44 is rotatable about and selectively connectable with the countershaft 24. Co-planar gear set 50 includes gear 46 and gear 48. Gear 46 is connected for common rotation with second intermediate shaft 20 and intermeshes with gear 48, which rotates about and is selectively connectable with countershaft 24.

Gear set 60 includes co-planar intermeshing gears 50 and 52. Gear 50 is connected for common rotation with the second intermediate shaft 20 and intermeshes with gear 52, which is rotatable about and selectively connectable with countershaft 24.

Gear set 70 includes co-planar, intermeshing gears 54 and 56. Gear 54 rotates about first intermediate shaft 18 and is selectively connectable with second intermediate shaft 20. Gear 54 intermeshes with gear 56, which is connected for common rotation with countershaft 24.

Gear set 80 includes gear 58 and gear 60. Gear 58 is connected for common rotation with the output shaft 14 and is selectively connectable with the first intermediate shaft 18. Gear 58 intermeshes with gear 60. Gear 60 is connected for common rotation with the countershaft 24.

The transmission 10 includes a variety of torque-transmitting mechanisms or devices including first input clutch 62, second input clutch 64, and third input clutch 66 and brake member 67. First input clutch 62 is selectively engagable to connect the input shaft 12 with the ring gear member 32. Second input clutch 64 is selectively engagable to connect the input shaft 12 with the carrier member 34. Third input clutch 66 is selectively engagable to connect the input shaft 12 with the sun gear member 30 and first intermediate shaft 18. Brake member 67 is selectively engagable to connect second intermediate shaft 20 to a stationary member such as the transmission housing to restrict rotation of the second intermediate shaft 20.

The transmission 10 further includes a plurality of selectively engagable synchronizers 90, 92, 94, 96, 98, and 99. Synchronizer 90 is selectively engagable to connect gear 44 with countershaft 24 for common rotation therewith. Synchronizer 92 is selectively engagable to connect gear 48 with countershaft 24 for common rotation therewith. Synchronizer 94 is selectively engagable to connect gear 52 with countershaft 24 for common rotation therewith. Synchronizer 96 is selectively engagable to connect the brake member 67 to second intermediate shaft 20 to restrict rotation of shaft 20. Synchronizer 98 is selectively engagable to connect gear 54 with second intermediate shaft 20 for common rotation therewith. Synchronizer 99 is selectively engagable to connect gear 58 with first intermediate shaft 18 and, therefore, output shaft 14 with the intermediate shaft 18 for common rotation therewith.

The transmission 10 is capable of transmitting torque from the input shaft 12 to the output shaft 14 in at least seven forward torque ratios and two reverse torque ratios as indicated in the truth table of FIG. 2. Each of the forward torque ratios and the reverse torque ratio is attained by engagement of one of the first, second, third torque-transmitting mechanism or input clutches 62, 64, 66 and one or more of the synchronizers 90, 92, 94, 96, 98 and 99. Those skilled in the art will readily understand that a different speed ratio is associated with each torque ratio. Thus, seven forward speed ratios may be attained by the transmission 10.

To establish the reverse torque ratio (Gear Rev 1), the input clutches and synchronizers are selected as set forth in the table of FIG. 2. The input clutch 66 and synchronizers 90 and 96 are engaged. The input clutch 66 connects the sun gear member 30 with the input shaft 12. Synchronizer 90 connects gear 44 for common rotation with countershaft 24. Synchronizer 96 connects second intermediate shaft 20 with brake member 67 for braking and fixing the rotation of shaft 20. Torque is thus transferred from the input shaft 12 through the sun gear member 30 from ring gear member 32 and intermediate shaft 22 to gear 42 and gear 40 to countershaft 24. Torque is then transferred from gear 60 to gear 58 and thereby to the output shaft 14.

One additional reverse torque ratio (Gear Rev 2) also indicated in the truth table of FIG. 2 is optionally available. The input clutches and synchronizers are selected as set forth in the table of FIG. 2. The input clutch 66 and synchronizers 90 and 92 are engaged. In this arrangement, torque flows through sun member 30, pinion gears 36 and ring gear member 32 to third intermediate shaft 22. The torque is then transferred through gear set 40 to countershaft 24, due to the engagement of synchronizer 90, and then to output shaft 14 through gear set 80. Torque also flows through sun gear member 30, pinion gears 36 and carrier member 34 to second intermediate shaft 20. Torque is then transferred through gear set 50 due to engagement of synchronizer 92, and then from countershaft 24 to output shaft 14 through gear set 80.

A first forward torque ratio (listed as Gear 1 in the truth table of FIG. 2), is achieved by engaging the input clutch 66 and synchronizers 90 and 98. In this arrangement, torque is transferred from the input shaft 12 through the sun gear member 30, pinion gear members 36 and ring gear member 32 to the third intermediate shaft 22. By the engagement of the synchronizer 90 and through gear set 40 torque is transferred to the countershaft 24. Torque is then transferred to the output shaft 14 through the gear set 80. Torque also flows through sun gear member 30, pinion gears 36 and carrier member 34 to second intermediate shaft 20. Torque is then transferred through gear set 70 due to engagement of synchronizer 98, and then from countershaft 24 to output shaft 14 through gear set 80.

A subsequent forward torque ratio, indicated as Gear 2 in FIG. 2, is established by engagement of input clutch 64 and synchronizer 98. Gear 2 may be achieved directly from Gear 1 without mechanical tie-up of the transmission 10. The shift from Gear 1 to Gear 2 occurs as follows. First, ensure that clutches 62 and 64 and synchronizers 92, 94, 96 and 99 are released and synchronizer 98 remains engaged. Second, clutch 66 is released and clutch 64 is engaged. Finally, synchronizer 90 is released only after clutch 64 is engaged and after the transmission control system determines that a shift back to a lower gear is not imminent. In Gear 2, torque is transferred from the input shaft 12 to the second intermediate shaft 20 via the engaged input clutch 64. Torque is transferred along gear set 70, countershaft 24 and gear set 80 to output shaft 14 due to engagement of synchronizer 98.

The subsequent torque ratio, indicated as Gear 3 in the truth table of FIG. 2, is established by the engagement of the input clutch 62 and synchronizer 90. The shift from Gear 2 to Gear 3 occurs as follows. First, ensure that clutches 62 and 66 and synchronizers 92, 94, 96 and 99 are released. Second, synchronizer 90 is engaged to pre-select Gear 3. Third, clutch 64 is released and clutch 62 is engaged. Finally, synchronizer 98 is released only after clutch 62 is engaged and after the transmission control system determines that a shift back to a lower gear is not imminent. The input clutch 62 directs torque through ring gear member 32 and pinion gears 36 to both the intermediate shafts 20 and 22 via the carrier member 34 and ring gear member 32, respectively. The torque carried along intermediate shaft 22 is transferred to countershaft 24 through gear set 40 and then to output shaft 14 through gear set 80 due to engagement of synchronizer 90.

The next subsequent forward torque ratio, indicated as Gear 4 in the truth table of FIG. 2, is established with the engagement of the input clutch 64 and synchronizer 94. The shift from Gear 3 to Gear 4 occurs as follows. First, ensure that clutches 64 and 66 and synchronizers 92, 96, 98 and 99 are released. Second, synchronizer 94 is engaged to pre-select Gear 4. Third, clutch 62 is released and clutch 64 is engaged. Finally, synchronizer 90 is released only after clutch 64 is engaged and after the transmission control system determines a shift back to a lower gear is not imminent. Torque is transferred from the input shaft 12 to second intermediate shaft 20 through carrier member 34 and pinion gears 36 due to engaged input clutch 64. Torque is then transferred through gear set 60 to countershaft 24 due to engagement of synchronizer 94. Torque is transferred through gear set 80 to output shaft 14.

A subsequent forward torque ratio indicated as Gear 5 in FIG. 2, is established with the engagement of input clutch 66 and synchronizer 99. The shift from Gear 4 to Gear 5 occurs as follows. First, ensure that clutches 62 and 66 and synchronizers 90, 92, 96 and 98 are released. Second, synchronizer 99 is engaged to pre-select Gear 5. Third, clutch 64 is released and clutch 66 is engaged. Finally, synchronizer 94 is released only after clutch 66 is engaged and after the transmission control system determines that a shift back to a lower gear is not imminent. Torque is transferred from the input shaft 12 along first intermediate shaft 18 directly to the output shaft 14 due to engagement of the input clutch 66 and synchronizer 99. Thus, a direct drive ratio is achieved, with the speed and torque of the output shaft 14 and the speed and torque of the input shaft 12 being equal.

A subsequent forward torque ratio indicated as Gear 6 in the truth table of FIG. 2 is established with the engagement of input clutch 64 and synchronizer 92. The shift from Gear 5 to Gear 6 occurs as follows. First, ensure that clutches 62 and 64 and synchronizers 90, 94, 96 and 98 are released. Second, synchronizer 92 is engaged to pre-select Gear 6. Third, clutch 66 is released and clutch 64 is engaged. Finally, synchronizer 99 is released only after clutch 64 is engaged and after the transmission control system determines that a shift back to a lower gear is not imminent. Torque is transferred from the input shaft 12 through the carrier member 34 and pinion gears 36, by engagement of the input clutch 64, to second intermediate shaft 20. The torque carried on second intermediate shaft 20 is transferred to countershaft 24 through gear set 50 by engagement of the synchronizer 92. The torque carrier on countershaft 24 is transferred via the gear set 80 to output shaft 14.

To establish the next subsequent torque ratio, indicated as Gear 7 in the truth table of FIG. 2, input clutch 62 is engaged and synchronizers 92 and 99 are engaged. The shift from Gear 6 to Gear 7 occurs as follows. First, ensure that clutches 62 and 66 and synchronizers 90, 94, 96 and 98 are released. Second, synchronizer 99 is engaged to pre-select Gear 7. Third, clutch 64 is released and clutch 62 is engaged. Finally, synchronizer 92 remains engaged in Gear 7. Torque is transferred from the input shaft 12 to ring gear member 32 and third intermediate shaft 22 through engagement of input clutch 62 and to second intermediate shaft 20 through carrier member 34 and pinions 36. Torque is then transferred through gear set 50 due to engagement of synchronizer 92 to countershaft 24 and through gear set 80 to output shaft 14. Torque is also transferred to first intermediate shaft 18 through sun gear 30 and then through gear 58 to output shaft 14 by the engagement of synchronizer 99.

The present invention contemplates that downshifts follow essentially the reverse sequence of the corresponding upshift (as described above), and several power-on skip-shifts are possible (e.g. from 1st to 3rd, or from any physical gear ratio to any physical gear ratio on a different shaft).

Figure 3:
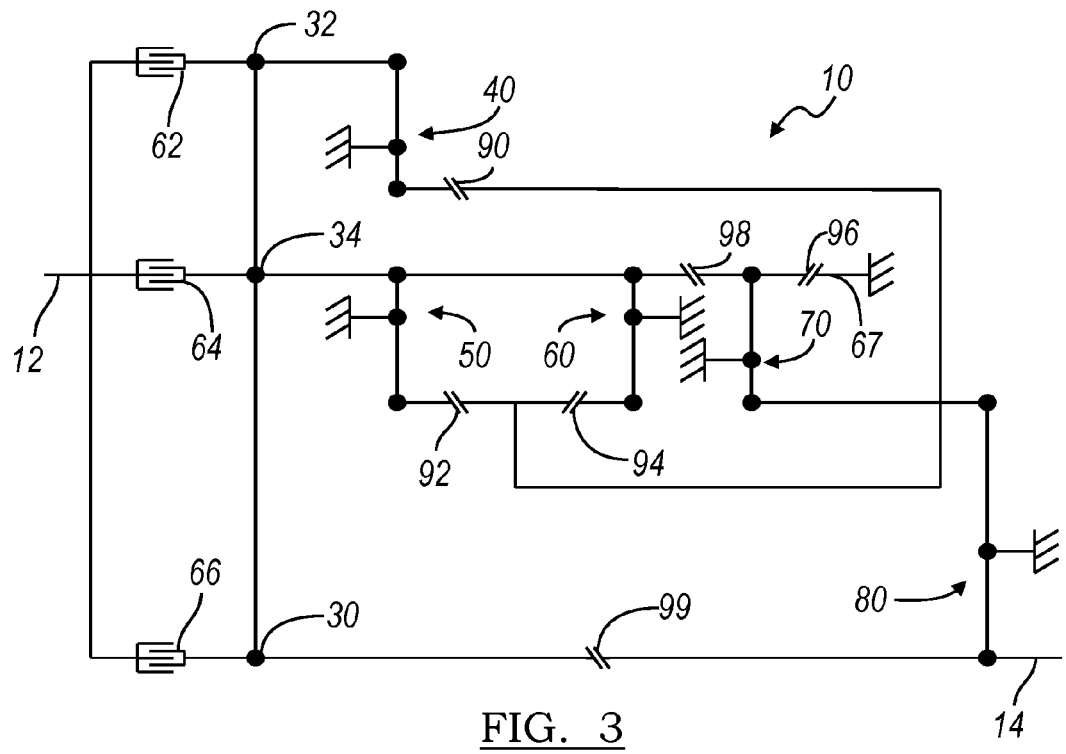
FIG. 3 is schematic representation of the transmission of FIG. 1 illustrating the power flow from the input through the gear sets to the output, in accordance with the present invention.
Figure 4:
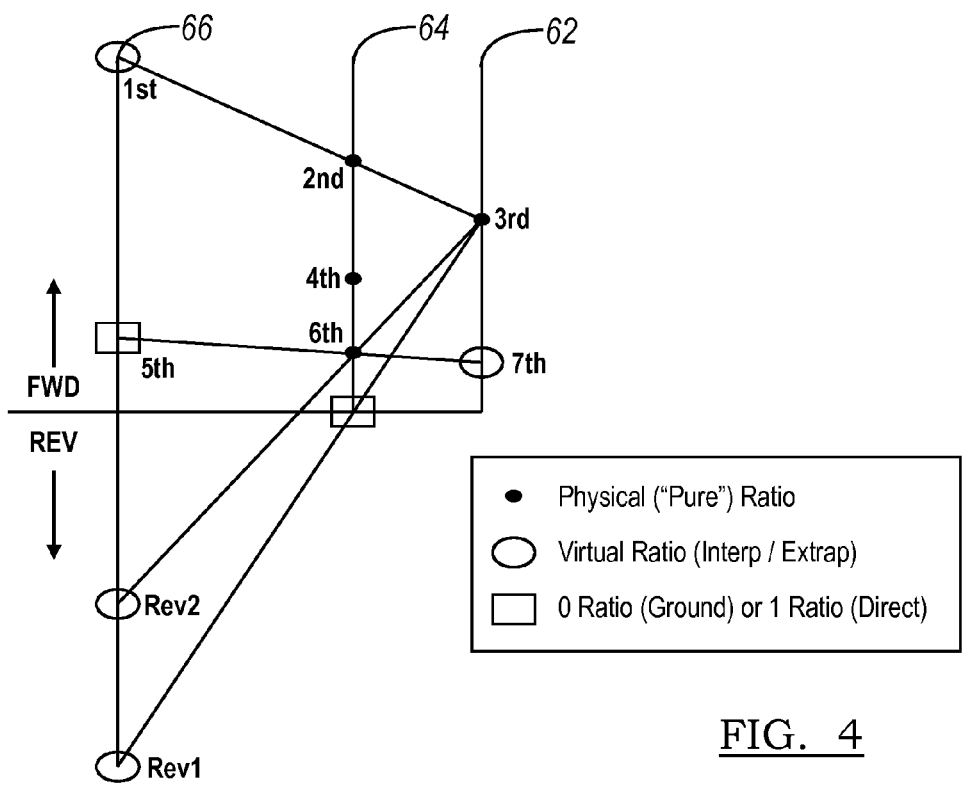
FIG. 4 is a diagram illustrating the relationship between the physical gears and the virtual gears of the transmission of FIG. 1, in accordance with the present invention.

With reference to FIG. 3, a schematic representation of the transmission of FIG. 1 is illustrated as a lever diagram. More specifically, the power flow from the input shaft 12 through the gear sets 40, 50, 60, 70, and 80 to the output shaft 14 is shown for ease of reference. Further, a diagram illustrating the relationship between the physical or "pure" gears and the virtual gears of the transmission of FIG. 1 is provided in FIG. 4. As illustrated in FIG. 4, the reverse gear ratios (REV1 and REV2) and the first and seventh gear ratios are virtual or blended gear ratios achieved by mixing or blending the ratios produced by the physical gears.

Figures 5, 6:
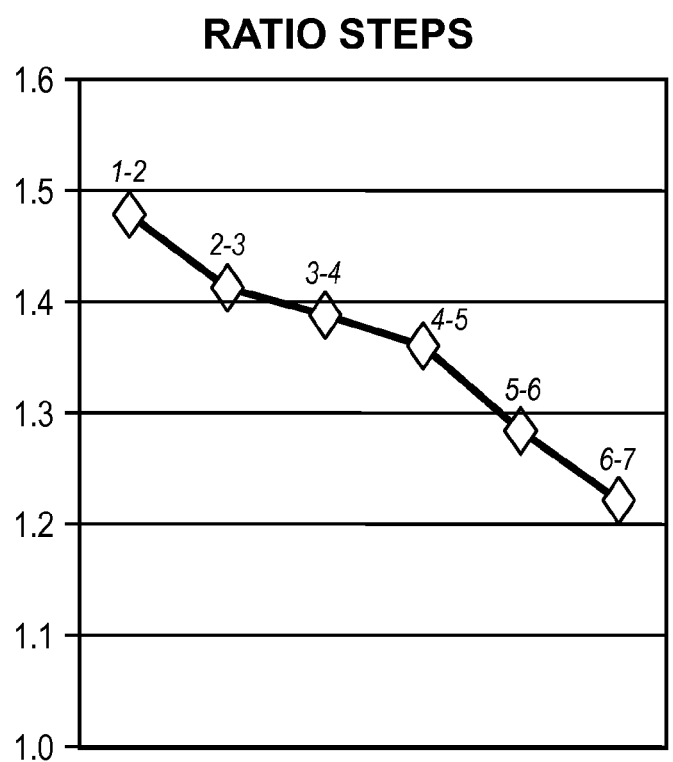
FIG. 5 is a chart illustrating exemplary gear ratios and ratio steps from one gear to a subsequent gear of the transmission of FIG. 1 in accordance with the present invention.
FIG. 6 is a graph illustrating the exemplary ratio steps from one gear to a subsequent gear of the transmission of FIG. 1, in accordance with the present invention.

Referring to FIG. 5, torque ratios (i.e., the ratio of torque of the output member 14 to the input member 12) corresponding with each of the Gears shown in the truth table of FIG. 2 are listed. These torque ratios are achieved utilizing the following sample component torque ratios which, in turn, are dependent on tooth counts of the gears of the transmission 10: the ring gear member/sun gear member planetary gear set torque ratio is 1.63 for a simple planetary gear arrangement; the torque ratio of gear 44 to gear 42 is 2.05; the torque ratio of gear 48 to gear 46 is 1.45; the torque ratio of gear 52 to gear 50 is 0.60; the torque ratio of gear 56 to gear 54 is 0.49; the torque ratio of gear 60 to gear 58 is 0.96. The ratio steps between subsequent torque ratios are indicated in FIG. 5, with an overall torque ratio of 6.20. It is apparent from the truth table of FIG. 2 and the ratio chart of FIG. 5 that torque ratios that are achieved utilizing the input clutch 62 (i.e., with input clutch 62 in an engaged state) have a numerical value between subsequent on-coming and off-going torque ratios. Thus, by utilizing the input clutch 62 and the planetary gear set, additional torque ratios are achieved than would be achievable with only the input clutches 62 and 66, as the latter result in torque ratios dependant only on the ratios of the countershaft gear sets and not of the planetary gear set. The ratio steps from one gear to a subsequent gear (ie. Gear 1 to Gear 2) are shown in the graph of FIG. 6.

Figures 7, 8:
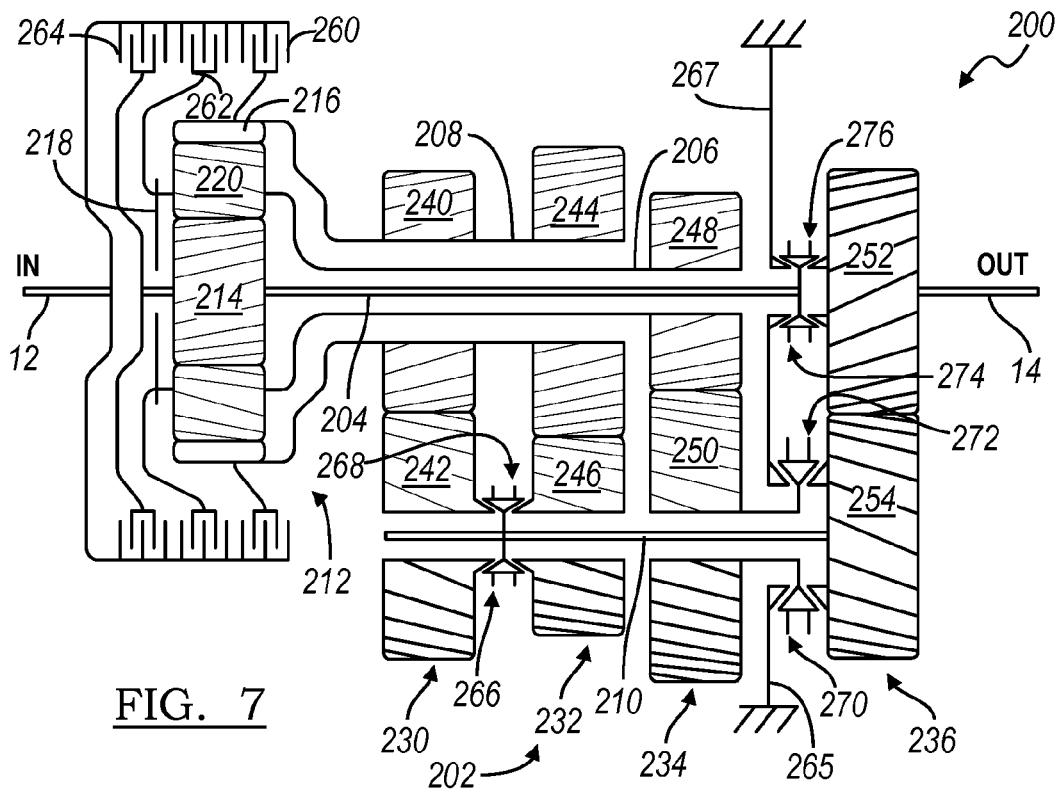
FIG. 7 is a schematic representation of an alternate embodiment of a transmission, in accordance with the present invention.
FIG. 8 is a truth table listing the engaged torque-transmitting mechanisms and synchronizers for selected torque ratios achieved by the transmission of FIG. 7.

Referring now to FIG. 7, an alternate multi-speed transmission 200 is depicted. The transmission 200 includes an input member 12 and an output member 14. In this embodiment, the input member 12 and the output member 14 are shafts, and will be referred to as such. Those skilled in the art will appreciate that the input and output members 12, 14 may be components other than shafts. The input shaft 12 is continuously connected with an engine (not shown). The output shaft 14 is continuously connected with the final drive unit (not shown). The transmission 200 includes a countershaft gearing arrangement 202 that includes intermediate shafts, a countershaft, co-planar intermeshing gear sets and selectively engagable synchronizers as will be described herein. For instance, the countershaft gearing arrangement 202 includes first intermediate shaft 204, a second intermediate shaft 206 and a third intermediate shaft 208. Second intermediate shaft 206 is a sleeve shaft concentric with first intermediate shaft 204. Third intermediate shaft 208 is a sleeve shaft concentric with second intermediate shaft 206. The countershaft gearing arrangement 202 further includes a countershaft 210. The countershaft 210 is both spaced from and parallel with the input shaft 12, the output shaft 14 and the intermediate shafts 204, 206 and 208.

Planetary gear set 212, which is a simple planetary gear set, is connected between the input shaft 12 and the output shaft 14. The planetary gear set 212 includes sun gear member 214 connected for common rotation with first intermediate shaft 204, a ring gear member 216 connected for common rotation with third intermediate shaft 208, and a carrier member 218 which rotatably supports a set of pinion gears 220 which intermesh with both the sun gear member 214 and the ring gear member 216.

The countershaft gearing arrangement 202 also includes co-planar, intermeshing gear sets 230, 232, 234 and 236. Gear set 230 includes gears 240 and 242. Gear 240 is connected for common rotation with third intermediate shaft 208 and intermeshes with gear 242, which is rotatable about and selectively connectable with the countershaft 210. Gear set 232 includes gear 244 and gear 246. Gear 244 is connected for common rotation with third intermediate shaft 208 and intermeshes with gear 246, which is rotatable about and selectively connectable with the countershaft 210.

Co-planar gear set 234 includes gear 248 and gear 250. Gear 248 is connected for common rotation with second intermediate shaft 206 and intermeshes with gear 250, which rotates about and is selectively connectable with countershaft 210.

Gear set 236 includes co-planar intermeshing gears 252 and 254. Gear 252 is selectively connectable for common rotation with the intermediate shaft 204 and intermeshes with gear 254, which is rotatable about and selectively connectable with countershaft 210.

The transmission 200 includes a variety of torque-transmitting mechanisms or devices including input clutch 260, input clutch 262, input clutch 264 and first brake member 265 and second brake member 267. Input clutch 260 is selectively engagable to connect the input shaft 12 with the ring gear member 216 and third intermediate shaft 208. Input clutch 262 is selectively engagable to connect the input shaft 12 with the carrier member 218 and second intermediate shaft 206. Input clutch 264 is selectively engagable to connect the input shaft 12 with the sun gear member 214 and first intermediate shaft 204. The transmission 200 further includes a plurality of selectively engagable synchronizers 266, 268, 270, 272, 274, and 276. Synchronizer 266 is selectively engagable to connect gear 242 with countershaft 210 for common rotation therewith. Synchronizer 268 is selectively engagable to connect gear 246 with countershaft 210 for common rotation therewith. Synchronizer 270 is selectively engagable to connect gear 250 with first brake member 265 for restricting rotation of gear 250. Synchronizer 272 is selectively engagable to connect the gear 254 with countershaft 210 for common rotation therewith. Synchronizer 274 is selectively engagable to connect first intermediate shaft 204 with second brake member 267 for restricting rotation of shaft 204. Synchronizer 276 is selectively engagable to connect first intermediate shaft 204 with gear 252 for common rotation therewith and therefore with the output shaft 14.

The transmission 200 is capable of transmitting torque from the input shaft 12 to the output shaft 14 at the seven forward torque ratios and two reverse torque ratios indicated in the truth table of FIG. 8. Those skilled in the art will readily understand how these torque ratios are achieved, based on the description of transmission 10.

Figure 9:
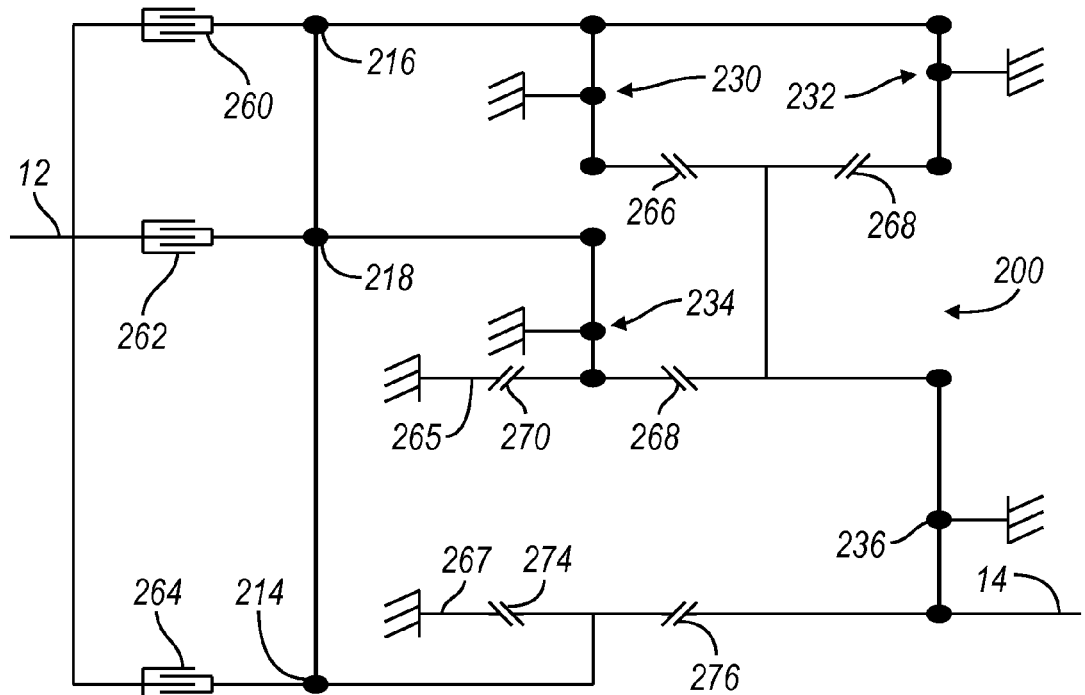
FIG. 9 is schematic representation of the transmission of FIG. 7 illustrating the power flow from the input through the gear sets to the output, in accordance with the present invention.
Figure 10:
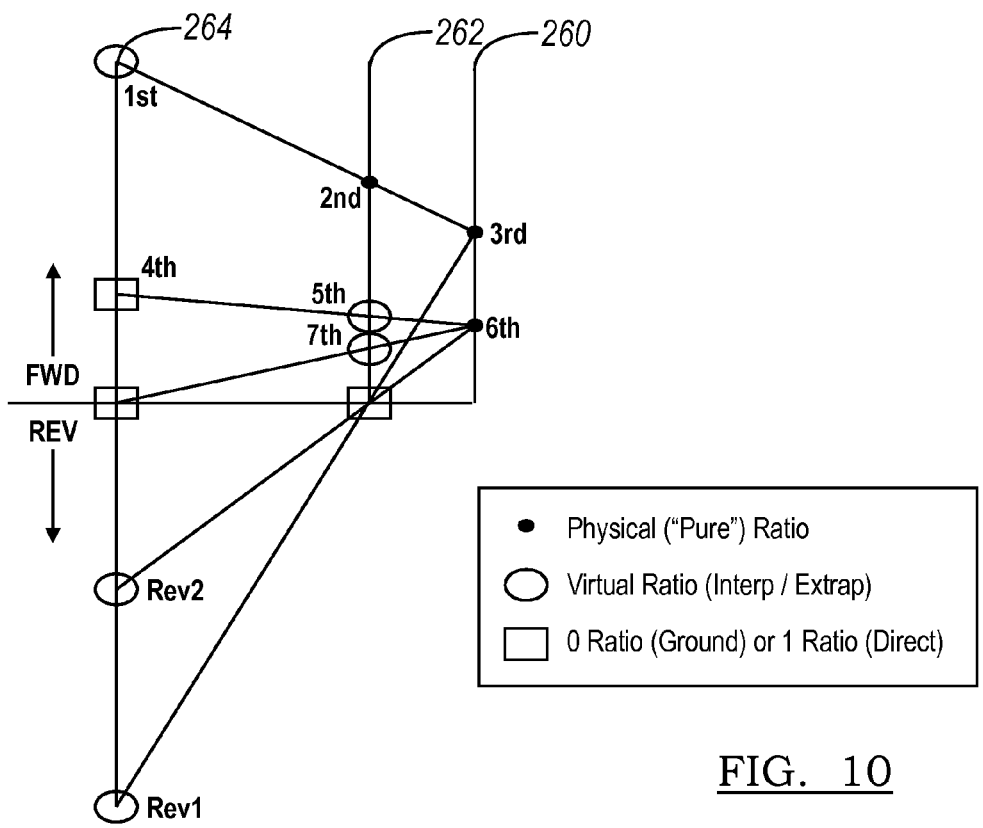
FIG. 10 is a diagram illustrating the relationship between the physical gears and the virtual gears of the transmission of FIG. 7, in accordance with the present invention.

With reference to FIG. 9, a schematic representation of the transmission 200 of FIG. 7 is illustrated. More specifically, the power flow from the input shaft 12 through the gear sets 230, 232, 234 and 236 to the output shaft 14 is shown for ease of reference. Further, a diagram illustrating the relationship between the physical or "pure" gears and the virtual gears of the transmission 200 of FIG. 7 is provided in FIG. 10. As illustrated in FIG. 10, the reverse gear ratios (REV1 and REV2), the first, fifth and seventh gear ratios are virtual or blended gear ratios achieved by mixing or blending the ratios produced by the physical gears.

Figures 11, 12:
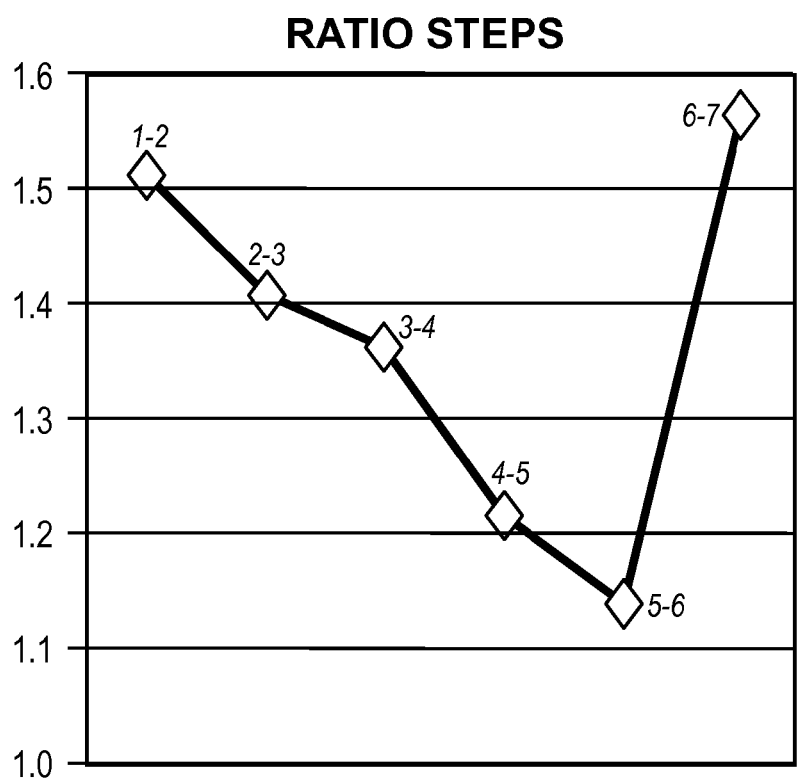
FIG. 11 is a chart illustrating exemplary gear ratios and ratio steps from one gear to a subsequent gear of the transmission of FIG. 7 in accordance with the present invention.
FIG. 12 is a graph illustrating the exemplary ratio steps from one gear to a subsequent gear of the transmission of FIG. 7, in accordance with the present invention.

Referring to FIG. 11, torque ratios (i.e., the ratio of torque of the output member 14 to the input member 12) corresponding with each of the Gears shown in the truth table of FIG. 8 are listed. These torque ratios are achieved utilizing the following sample component torque ratios which, in turn, are dependent on tooth counts of the gears of the transmission 200: the ring gear member/sun gear member planetary gear set torque ratio is 1.77 for a simple planetary gear arrangement; the torque ratio of gear 240 to gear 242 is 1.63; the torque ratio of gear 244 to gear 246 is 1.16; the torque ratio of gear 248 to gear 250 is 0.61; the torque ratio of gear 252 to gear 254 is 1.18. The ratio steps between subsequent torque ratios are indicated in FIG. 11, with an overall torque ratio of 6.304. It is apparent from the truth table of FIG. 8 and the ratio chart of FIG. 11 that torque ratios that are achieved utilizing the input clutch 260 (i.e., with input clutch 260 in an engaged state) have a numerical value between subsequent on-coming and off-going torque ratios. Thus, by utilizing the input clutch 260 and the planetary gear set, additional torque ratios are achieved than would be achievable with only the input clutches 260 and 264, as the latter result in torque ratios depend only on the ratios of the countershaft gear sets and not of the planetary gear set. The ratio steps from one gear to a subsequent gear (i.e. Gear 1 to Gear 2) is shown in the graph of FIG. 12 for the convenience of the reader.

The present invention has many advantages and benefits over prior art transmissions, which have either provided no "virtual" (blended) ratios, or have achieved additional "virtual" gear ratios only through interpolation. Through the use of three input clutches, the torque-blending input gear set, and three intermediate shafts, the present invention provides additional gear ratios through interpolation and extrapolation and therefore additional brakes, clutches, synchronizers and idler gears are not required to achieve additional gear ratios including reverse gears.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
 an input member;
 an output member;
 a planetary gear set having first, second and third members;
 a first, a second and a third torque-transmitting mechanism each selectively engageable to connect the input member with a respective different one of the members of the planetary gear set;
 a countershaft gearing arrangement operatively connected with the planetary gear set and including:
  a first intermediate shaft connected for common rotation with the first member of said planetary gear set;
  a second intermediate shaft connected for common rotation with the second member of said planetary gear set, wherein the second intermediate shaft is concentric with the first intermediate shaft;
  a third intermediate shaft connected for common rotation with the third member of said planetary gear set, wherein the third intermediate shaft is concentric with the second intermediate shaft;
  a countershaft radially offset from the intermediate shafts;
  a plurality of sets of co-planar intermeshing gears, wherein at least one of the plurality of sets of co-planar intermeshing gears are fixed for common rotation with at least one of the intermediate shafts; and
  a plurality of synchronizers, wherein at least one of the plurality of synchronizers is selectively engagable to connect at least one of the gears of the plurality of sets of co-planar intermeshing gears with at least one of the first, second and third intermediate shafts for common rotation therewith, thereby transferring torque from the planetary gear set to the output member through at least one of the intermediate shafts and at least one of the sets of co-planar intermeshing gears, and wherein at least one other of the plurality of synchronizers is selectively engagable to connect at least one other of the gears of the plurality of sets of co-planar intermeshing gears with the countershaft for common rotation therewith.

2. The transmission of claim 1 wherein the first member of the planetary gear set is a sun gear, the second member of the planetary gear set is a planet carrier and third member of the planetary gear set is a ring gear.

3. The transmission of claim 2 wherein the first torque-transmitting mechanism is selectively engageable to connect the input member with the ring gear of the planetary gear set, the second torque-transmitting mechanism is selectively engageable to connect the input member with the planet carrier of the planetary gear set and the third torque-transmitting mechanism is selectively engageable to connect the input member with the sun gear of the planetary gear set.

4. The transmission of claim 1 wherein the plurality of sets of co-planar intermeshing gears includes at least four co-planar intermeshing gears sets.

5. The transmission of claim 4 wherein at least one of the four co-planar intermeshing gears is configured to transfer torque between at least one of intermediate shafts and the countershaft.

6. The transmission of claim 1 wherein the plurality of sets of co-planar intermeshing gears includes at least five co-planar intermeshing gears sets.

7. The transmission of claim 6 wherein at least two of the five co-planar intermeshing gears are configured to transfer torque between at least two of intermediate shafts and the countershaft.

8. The transmission of claim 2 wherein the first intermediate shaft is connected for common rotation with sun gear of the planetary gear set.

9. The transmission of claim 2 wherein the second intermediate shaft is connected for common rotation with the planet carrier of said planetary gear set.

10. The transmission of claim 2 wherein the third intermediate shaft is connected for common rotation with the ring gear of said planetary gear set.

11. The transmission of claim 2 wherein at least two of the plurality of sets of co-planar intermeshing gears are fixed for common rotation with the second intermediate shaft.

12. The transmission of claim 1 wherein the plurality of synchronizers further includes a first synchronizer for selectively connecting a first gear of the sets of co-planar intermeshing gears with the countershaft.

13. The transmission of claim 12 wherein the plurality of synchronizers further includes a second synchronizer for selectively connecting a second gear of the sets of co-planar intermeshing gears with the countershaft.

14. The transmission of claim 13 wherein the plurality of synchronizers further includes a third synchronizer for selectively connecting a third gear of the sets of co-planar intermeshing gears with the countershaft.

15. The transmission of claim 14 wherein the plurality of synchronizers further includes a fourth synchronizer for selectively connecting a fourth gear of the sets of co-planar intermeshing gears with a housing of the transmission.

16. The transmission of claim 15 wherein the plurality of synchronizers further includes a fifth synchronizer for selectively connecting a fifth gear of the sets of co-planar intermeshing gears with the second intermediate shaft.

17. The transmission of claim 16 wherein the plurality of synchronizers further includes a sixth synchronizer for selectively connecting a sixth gear of the sets of co-planar intermeshing gears with the first intermediate shaft.

18. A transmission comprising:
 an input member;
 an output member;
 a planetary gear set having a sun gear, a carrier member and a ring gear;
 a first, a second and a third torque-transmitting mechanism each selectively engageable to connect the input member with a respective different one of the sun gear, the carrier member and the ring gear of the planetary gear set;
 a countershaft gearing arrangement operatively connected with the planetary gear set and including:
  a first intermediate shaft connected for common rotation with the sun gear of said planetary gear set;

a second intermediate shaft connected for common rotation with the carrier member of said planetary gear set, wherein the second intermediate shaft is concentric with the first intermediate shaft;

a third intermediate shaft connected for common rotation with the ring gear of said planetary gear set, wherein the third intermediate shaft is concentric with the second intermediate shaft;

a countershaft radially offset from the intermediate shafts;

at least four sets of co-planar intermeshing gears, wherein at least one of the at least four sets of co-planar intermeshing gears are fixed for common rotation with at least one of the intermediate shafts; and six synchronizers, wherein at least one of the six synchronizers is selectively engagable to connect at least one of the gears of the four sets of co-planar intermeshing gears with at least one of the first, second and third intermediate shafts for common rotation therewith, thereby transferring torque from the planetary gear set to the output member through at least one of the intermediate shafts and at least one of the four sets of co-planar intermeshing gears, and wherein at least one other of the six synchronizers is selectively engagable to connect at least one other of the gears of the at least four sets of co-planar intermeshing gears with the countershaft for common rotation therewith, and wherein torque is transferred from the input member to the output member through at least one of the torque-transmitting mechanisms, the planetary gear set and the countershaft gearing arrangement to provide at least seven forward speed gear ratios and at least two reverse gear ratios.

19. The transmission of claim 18 wherein at least one of the at least four sets of co-planar intermeshing gears are selectively connectable for common rotation with the first intermediate shaft.

20. The transmission of claim 18 wherein at least one of the at least four sets of co-planar intermeshing gears are selectively connectable for common rotation with the second intermediate shaft.

* * * * *